(12) United States Patent
Nemoto et al.

(10) Patent No.: US 11,320,374 B2
(45) Date of Patent: May 3, 2022

(54) FORGERY PREVENTION MEDIUM, FORGERY PREVENTION MEDIUM MANUFACTURING APPARATUS, AND FORGERY PREVENTION MEDIUM MANUFACTURING METHOD

(71) Applicant: Kabushiki Kaisha Toshiba, Minato-ku (JP)

(72) Inventors: Nobuki Nemoto, Kanagawa-ken (JP); Takahisa Nakano, Kanagawa-ken (JP); Fumitoshi Morimoto, Fukushima-ken (JP); Shota Kure, Kanagawa-ken (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 542 days.

(21) Appl. No.: 15/820,043

(22) Filed: Nov. 21, 2017

(65) Prior Publication Data
US 2018/0073983 A1 Mar. 15, 2018

Related U.S. Application Data

(62) Division of application No. 14/851,304, filed on Sep. 11, 2015, now abandoned.

(30) Foreign Application Priority Data

Sep. 12, 2014 (JP) ................. 2014-186725

(51) Int. Cl.
*B41M 3/14* (2006.01)
*B29C 65/00* (2006.01)
*G01K 11/12* (2021.01)
*B41M 5/28* (2006.01)
*B41M 5/30* (2006.01)
(Continued)

(52) U.S. Cl.
CPC ......... *G01N 21/6428* (2013.01); *B29C 65/00* (2013.01); *B41M 3/142* (2013.01); *B41M 3/144* (2013.01); *G01K 11/12* (2013.01); *B29L 2031/744* (2013.01); *B41M 5/282* (2013.01); *B41M 5/305* (2013.01); *G01N 2201/06113* (2013.01)

(58) Field of Classification Search
CPC ...... B41M 3/142; B41M 3/144; B41M 5/282; B41M 5/305; G01K 11/12
See application file for complete search history.

(56) References Cited

U.S. PATENT DOCUMENTS 5,873,604 A * 2/1999 Phillips ................... B41M 3/14
283/58
5,990,197 A 11/1999 Escano
(Continued)

FOREIGN PATENT DOCUMENTS

DE 102006038270 A1 * 2/2008 ............ B42D 25/41
JP 63-74053 A 4/1988
WO WO 2008/017300 A2 2/2008

*Primary Examiner* — Kelly M Gambetta
(74) *Attorney, Agent, or Firm* — Oblon, McClelland, Maier & Neustadt, L.L.P.

(57) ABSTRACT

A forgery prevention medium includes a substrate and a specific invisible material layer directly or indirectly laminated on the substrate, having a specific invisible material reversibly and visually recognized through a predetermined process disposed thereon in a plane shape, and having a part of the specific invisible material inactivated in accordance with a visualized image pattern.

1 Claim, 4 Drawing Sheets

(51) Int. Cl.
  *G01N 21/64* (2006.01)
  *B29L 31/00* (2006.01)

(56) References Cited

U.S. PATENT DOCUMENTS

| | | | |
|---|---|---|---|
| 6,413,305 B1 | 7/2002 | Mehta | |
| 7,628,336 B2* | 12/2009 | Reynolds | G06Q 20/342 |
| | | | 235/375 |
| 2002/0056756 A1 | 5/2002 | Cameron | |
| 2003/0000450 A1* | 1/2003 | Wesley | G01K 11/12 |
| | | | 116/207 |
| 2003/0127415 A1 | 7/2003 | Carballido | |
| 2005/0087605 A1 | 4/2005 | Auslander | |
| 2005/0098636 A1* | 5/2005 | Schumacher | B41M 5/286 |
| | | | 235/491 |
| 2007/0212501 A1* | 9/2007 | Wolfe | B65D 81/3876 |
| | | | 428/34.1 |

* cited by examiner

FORGERY PREVENTION MEDIUM, FORGERY PREVENTION MEDIUM MANUFACTURING APPARATUS, AND FORGERY PREVENTION MEDIUM MANUFACTURING METHOD

CROSS-REFERENCE TO RELATED APPLICATION

This application is a divisional of U.S. application Ser. No. 14/851,304 filed Sep. 11, 2015, and is based upon and claims the benefit of priority from the prior Japanese Patent Application No. 2014-186725, filed on Sep. 12, 2014, the entire contents of each of which are incorporated herein by reference.

FIELD

Embodiments of the present invention relate to a forgery prevention medium, a forgery prevention medium manufacturing apparatus, and a forgery prevention medium manufacturing method.

BACKGROUND

Conventionally, a technique of attaching ink of a specific invisible material to a desired position by an inkjet or thermal transfer scheme is generally used when an invisible latent image is formed by a specific invisible material such as a fluorescent material not visibly recognized in an ordinary state and particularly the invisible latent image is formed on demand.

As the specific invisible material, a material (hereinafter, referred to as a fluorescent material) that absorbs an ultraviolet ray and emits a visible ray is used in many cases.

As an invisible latent image forming method, there is proposed a method of forming an invisible latent image by a laser.

In a method of forming an invisible latent image by a laser, a fluorescent material applied to (laminated on) one surface is set as a first layer, an information recording medium as a second layer is formed by laminating a photochromic material not allowing the transmission of a UV ray by laminating a UV ray thereon, and a UV ray is irradiated to the second layer in accordance with a desired pattern so as to form a specific image by selectively changing the state of the second layer into a non-transmission state of a UV ray.

However, in this method, when the UV ray non-transmission layer as the second layer is peeled off and a UV ray non-transmission layer having a different pattern is laminated, there is a concern that an image recorded by the fluorescent material may be altered.

DETAILED DESCRIPTION

A forgery prevention medium of an embodiment includes a substrate and a specific invisible material layer directly or indirectly laminated on the substrate, having a specific invisible material reversibly and visually recognized through a predetermined process disposed thereon in a plane shape, and having a part of the specific invisible material inactivated in accordance with a visualized image pattern.

Next, an embodiment will be described with reference to the drawings.

Figure 1:
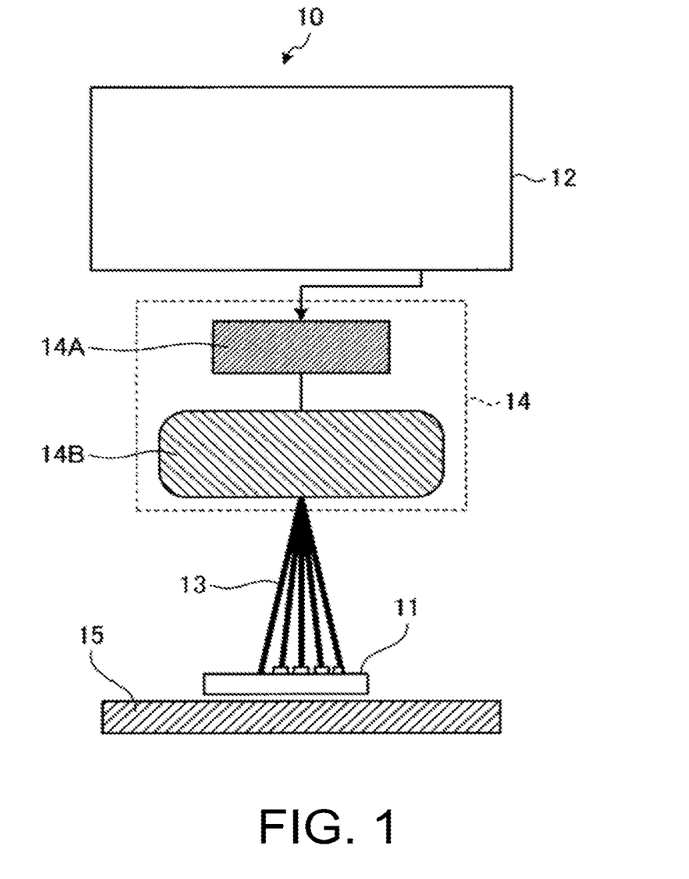
FIG. 1 is an outline configuration diagram of an image forming system.

FIG. 1 is an outline configuration diagram of an image forming system.

An image forming system 10 includes an image processing apparatus 12 that performs an image process on an original image corresponding to an image formed on a recording medium 11 as a forgery prevention medium, a laser irradiation device 14 that performs an inactivation process in which a laser beam 13 is irradiated to a specific invisible image forming portion of the recording medium 11 based on the image process result of the image processing apparatus 12 so as to form an invisible image as an invisible latent image, and a stage 15 that holds the recording medium 11 at a predetermined position when the invisible image is formed.

In this case, the laser irradiation device 14 includes a laser controller 14A that performs a laser emitting control based on the image process result of the image processing apparatus 12 and a laser oscillator 14B that emits a laser beam under the control of the laser controller 14A. Then, the laser irradiation device 14 performs an inactivation process of inactivating a specific invisible material by irradiating a laser beam to a pixel that maintains in a non-visible state, during a predetermined visualization process.

Specifically, when a fluorescent material (a UV fluorescent material or an IR fluorescent material) that emits fluorescent light by the irradiation of the UV ray or the IR ray is used as the specific invisible material, a pixel which does not need to emit light even by the irradiation of the UV ray or the IR ray is inactivated. Further, when a reversible temperature indicating material which reversibly changes from a colorless state (or a white state) to a color changed state or a colored state in accordance with an increase in temperature is used as the specific invisible material, a pixel which needs to be maintained in a colorless state (or a white state) is inactivated.

Figure 2:
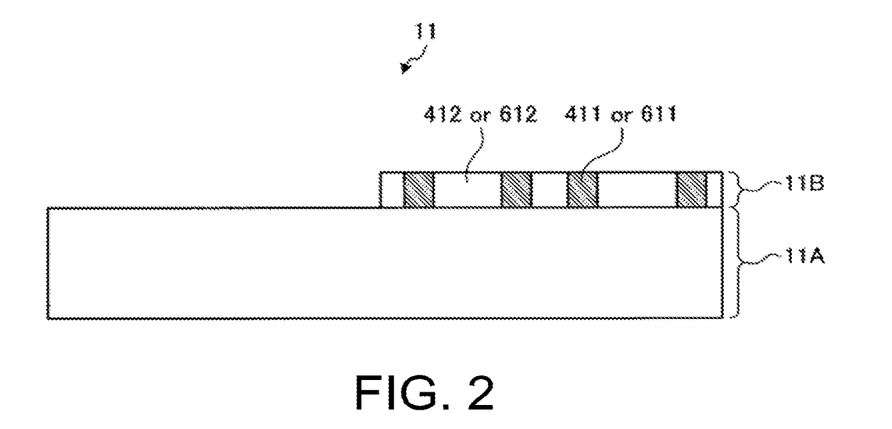
FIG. 2 is an outline cross-sectional view of a recording medium.

FIG. 2 is an outline cross-sectional view of the recording medium.

The recording medium 11 includes a normal recording medium 11A which includes a paper or plastic substrate and records various information items thereon by a normal printing process or the like.

Then, the recording medium 11 has a structure in which a specific invisible material layer 11B formed by disposing a specific invisible material on the surface (the upper surface in FIG. 2) of the normal recording medium 11A through coating, laminating, printing, or kneading is laminated on the normal recording medium 11A. The specific invisible material layer 11B may be laminated on the normal recording medium 11A through a layer such as an adhesion layer, a hologram layer, an image receiving layer for color printing, a ultraviolet reflection layer. Moreover, durability, such as scratch resistance, can be raised by preparing a protective layer on the special invisible material layer 11B.

Figure 3A:
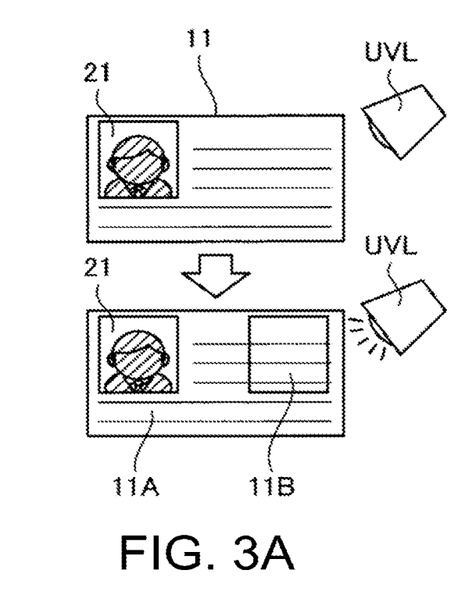
FIGS. 3A and 3B are diagrams illustrating states before and after an invisible image is formed on a specific invisible material layer when a UV fluorescent material is used as a specific invisible material.
Figure 3B:
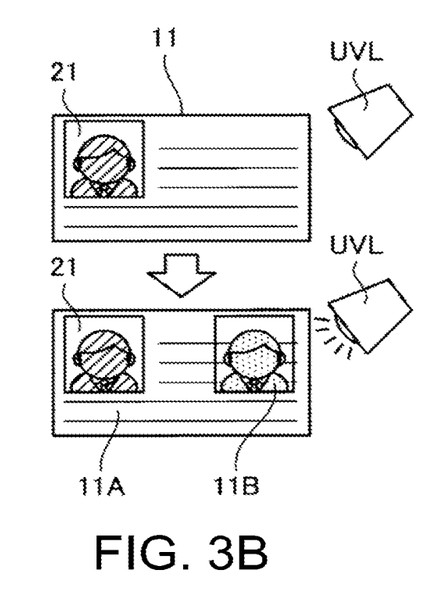

FIGS. 3A and 3B are diagrams illustrating states before and after an invisible image is formed on a specific invisible material layer when a UV fluorescent material is used as a specific invisible material.

FIG. 3A is a diagram illustrating a state before the invisible image is formed on the specific invisible material layer.

As illustrated in the upper diagram of FIG. 3A, a normal image 21 recorded on the normal recording medium 11A by printing or the like can be visibly recognized in the non-irradiation state of the UV ray.

In this state, as illustrated in the lower diagram of FIG. 3A, the entire specific invisible material layer 11B emits fluorescent light along with the normal image 21 in the irradiation state of the UV ray. Specifically, in the case of FIG. 3A, the entire rectangular area emits fluorescent light.

Subsequently, when the irradiation of the UV ray is stopped, the current state is returned to the state of the upper diagram of FIG. 3A.

FIG. 3B is a diagram illustrating a state after the invisible image is formed on the specific invisible material layer.

As illustrated in the upper diagram of FIG. 3B, the normal image 21 recorded on the normal recording medium 11A by printing or the like can be visibly recognized similarly to the case of FIG. 3A in the non-irradiation state of the UV ray.

On the contrary, as illustrated in the lower diagram of FIG. 3B, in the irradiation state of the UV ray, fluorescent light is not emitted from a pixel (in FIG. 3B, a black display pixel) inactivated by a laser beam in the specific invisible material layer 11B, but is emitted only from the other portion along with the normal image 21. For this reason, the fluorescent invisible latent image becomes a visualized image.

Subsequently, when the irradiation of the UV ray is stopped, the current state is returned to the state of the upper diagram of FIG. 3B.

According to the embodiment, since the invisible image is formed on the specific invisible material layer 11B, the tamper resistance of the invisible latent image recorded by the specific invisible material is improved.

[1] First Embodiment

Next, a first embodiment will be described in more detail.

The first embodiment is an embodiment in which a fluorescent material (a UV fluorescent material or an IR fluorescent material) that emits fluorescent light by the irradiation of a UV ray or an IR ray is used as a specific invisible material.

In a specific invisible image forming process, a desired image is binarized so as to generate a binary image data and a laser beam is irradiated to a pixel part to be inactivated in the specific invisible material layer 11B laminated in advance on the normal recording medium 11A based on the binary image data so as to inactivate the specific invisible material.

Accordingly, a desired image can be recorded as a specific image on the recording medium.

Hereinafter, this operation will be described in detail.

In the first embodiment, a YAG laser, a $YVO_4$ laser, a semiconductor laser, a $CO_2$ laser, or the like is desirable as a laser used to form an image pattern. Here, the harmonic waves of the YAG laser, the $YVO_4$ laser, and the semiconductor laser can be used in accordance with the absorbing wavelength of the recording medium 11 and the fluorescent material in addition to the basic waves of the YAG laser, the $YVO_4$ laser, the semiconductor laser, and the $CO_2$ laser.

Further, in the first embodiment, inorganic fluorescent substance disclosed in, for example, JP 50-6410 A, JP 61-65226 A, JP 64-22987 A, JP 64-60671 A, JP 1-168911 A, JP 2003-89761 A, and JP 2006-255925 A can be appropriately selected as the fluorescent material (the fluorescent invisible latent image forming material) as the specific invisible material for forming the specific image.

As the inorganic fluorescent compound, followings can be exemplified, such as
$Sr_2P_2O_7:Sn^{4+}$, $Sr_4Al_{14}O_{25}:Eu^{2+}$,
$BaMgAl_{10}O_{17}:Eu^{2+}$, $SrGa_2S_4:Ce^{3+}$, $CaGa_2S_4:Ce^{3+}$,
$(Ba,Sr)(Mg,Mn)Al_{10}O_{17}:Eu^{2+}$,
$(Sr,Ca,Ba,Mg)_{10}(PO_4)_6Cl_{12}:Eu^{2+}$,
$BAl_2Si_2O_8:Eu^{2+}$, $Sr_5(PO_4)_3Cl:Eu^{2+}$,
$Sr_2P_2O_7:Eu^{2+}$, $Sr(H_2PO4)_2:Eu^{2+}$,
$(BaMg)Al_{16}O_{27}:Eu^{2+}$, $Mn^{2+}$, $Sr_4Al_{14}O_{25}:Eu^{2+}$,
$(Sr,Ba)Al_2Si_2O_8:Eu^{2+}$, $(Ba,Mg)_2SiO_4:Eu^{2+}$,
$Y_2SiO_5:Ce^{3+}$, $Tb^{3+}$, $Sr_2P_2O_7$—$Sr_2B_2O_5:Eu^{2+}$,
$(Ba,Ca,Mg)_5(PO_4)_3Cl:Eu^{2+}$,
$Sr_2Si_3O_8\text{-}2SrC_{12}:Eu^{2+}$,
$Zr_2SiO_4$, $MgAl_{11}O_{19}:Ce^{3+}$, $Tb^{3+}$,
$Ca_2Y_8(SiO_4)_6O_2:Tb^{3+}$, $(GF\text{-}12)Y_3Al_5O_{12}:TB^{3+}$,
$La_3Ga_5SiO_{14}:Tb^{3+}$, $Y_2O_2S:Eu^{3+}$,
$(Ba,Mg)_2SiO_4:Eu^{3+}$,
$(Ba,Mg)Al_{16}O_{27}:Eu^{3+}$,
$(Ba,Ca,Mg)_5(PO_4)_3Cl:Eu^{3+}$,
$YVO_4:Eu^{3+}$, $CaS:Eu^{3+}$,
$YAlO_3:Eu^{3+}$, $Ca_2Y_8(SiO_4)_6O_2:Eu^{3+}$,
$LiY_9(SiO_4)_6O_2:Eu^{3+}$, $YVO_4:Eu^{3+}Bi^{2+}$, $Gd_2O_2S:Eu^{3+}$, $CaS:Eu^{3+}Cl^{-}$,
$(CaMg)_3(PO_4)_2:Sn^{2+}$.

Further, the organic fluorescent substance disclosed in JP 2005-15564 A, JP 2006-77191 A, JP 2006-348180 A, JP 2008-115225 A, and JP 2012-61794 A, and Magic Lumino Paint, Lumilite Color, and LOIHI MARKER (all is manufactured by SINLOIHI. CO. LTD) can be appropriately selected as the organic fluorescent substance.

Next, an operation of the first embodiment will be described.

Figure 4:
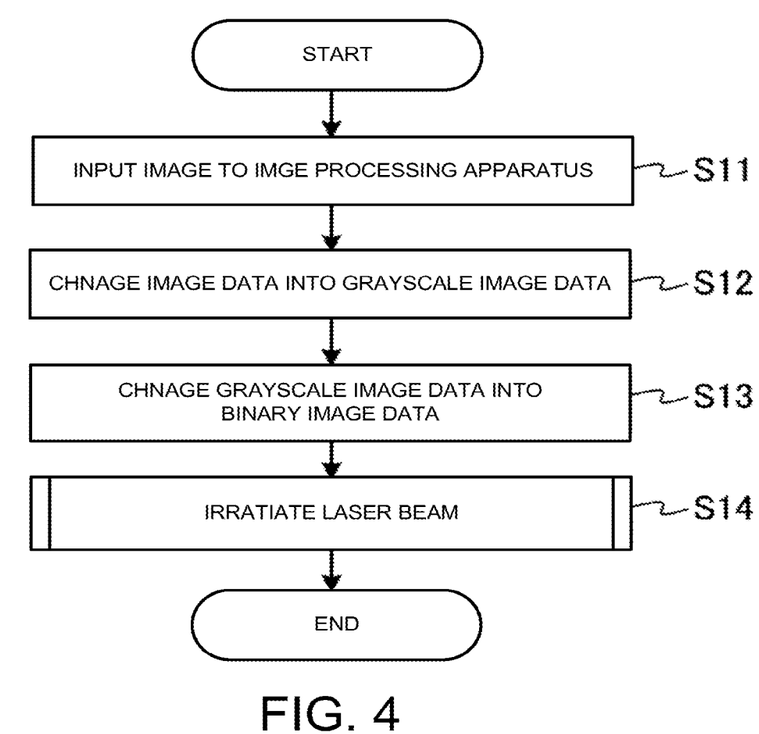
FIG. 4 is a flowchart illustrating a specific invisible image forming process of an embodiment.

FIG. 4 is a flowchart of a specific invisible image forming process of the embodiment.

First, an operator inputs a desired image to the image processing apparatus 12 (step S11).

Accordingly, the image processing apparatus 12 generates a grayscale image data (for example, a 256-grayscale monochromatic image) in which an input image is changed in grayscale (step S12).

Further, the image processing apparatus 12 generates a binary image data in which the grayscale image data is binarized and outputs the binary image to the laser controller 14A of the laser irradiation device 14 (step S13).

Thus, the laser controller 14A generates an invisible latent image by irradiating a laser beam oscillated from the laser oscillator 14B to the specific invisible material layer 11B laminated on the normal recording medium 11A of the recording medium 11 in accordance with the black pixel part indicated by the binary image data corresponding to the binary image (step S14). That is, the laser irradiation device 14 serves as an inactivation unit that inactivates an inactivation target pixel position of the specific invisible material layer by irradiating a laser beam thereto.

Figure 5:
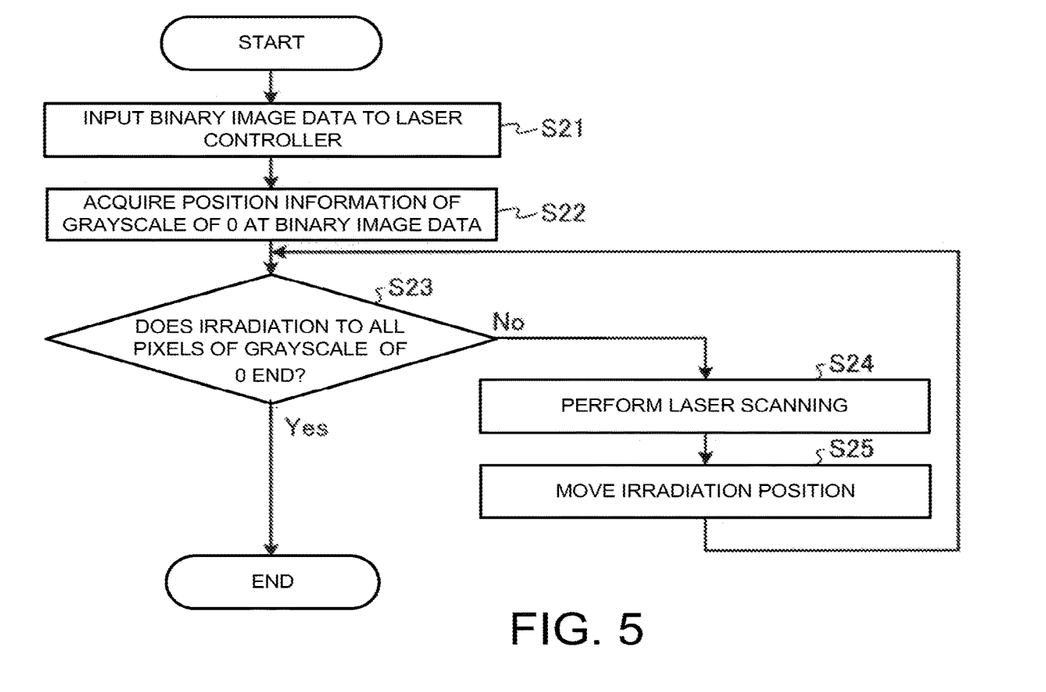
FIG. 5 is a flowchart illustrating an invisible latent image forming process of a first embodiment.

FIG. 5 is a flowchart of an invisible latent image forming process of the first embodiment.

Figure 6:
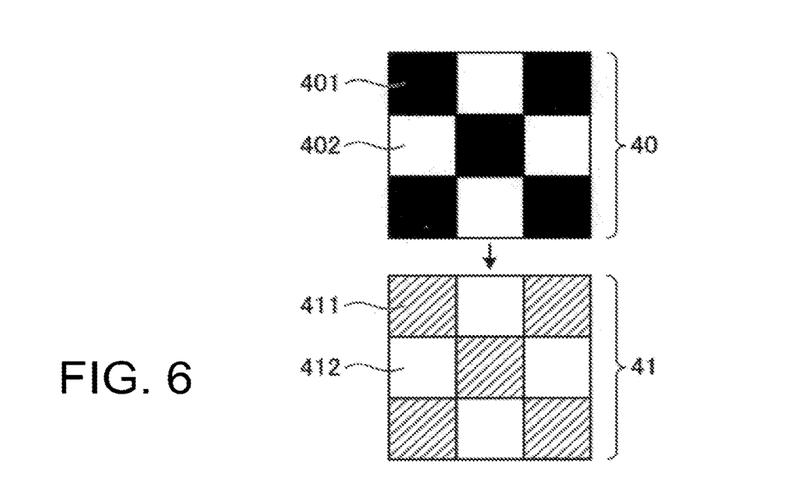
FIG. 6 is a diagram illustrating a binary image and an inactivation target pixel of the first embodiment.

FIG. 6 is a diagram illustrating a binary image and an inactivation target pixel of the first embodiment.

In the description below, the binary image corresponding to the binary image data is set so that a grayscale of a black pixel 401 is set to 0 and a grayscale of a white pixel 402 is set to 1.

When a binary image data is input to the laser controller 14A (step S21), the laser controller 14A acquires the position information of the black pixel 401 having a grayscale of 0 at the binary image illustrated in FIG. 6 (step S22). That is, the image processing apparatus 12 and the laser controller 14A serve as a pixel specification unit that specifies an inactivation target pixel position corresponding to a specific invisible image formed on a specific invisible material layer based on the input image data of the invisible target image. That is, the image processing apparatus 12 and the laser controller 14A specify a position of a pixel (a black pixel) that needs to stop the emission of fluorescent light during the irradiation of light of a predetermined wavelength as an inactivation target pixel position.

Next, the laser controller 14A determines whether the irradiation of the laser beam to all black pixels 401 having a grayscale of 0 ends (step S23).

In this case, since the irradiation of the laser beam is not performed (step S23; No), the laser controller 14A controls the laser oscillator 14B so that the laser beam is irradiated to the black pixel 401 having a grayscale of 0 corresponding to the scanning position through laser scanning (step S24). Accordingly, a specific invisible material 411 corresponding to the black pixel 401 is inactivated. On the contrary, a specific invisible material 412 corresponding to the white pixel 402 is activated as it is and an invisible latent image 41 is formed so as to correspond to the binary image data as a whole. That is, the pixel having a grayscale of 0 of the binary image 40 is recorded as a pixel that does not emit light during the irradiation of the UV ray.

Subsequently, the laser controller 14A moves the irradiation position (the scanning position) (step S25), and the process is returned to step S23 again.

Hereinafter, the processes in step S23 to step S25 are repeated in the same way during a period in which the irradiation of the laser beam to all black pixels 401 having a grayscale of 0 does not end by the determination in step S23 (step S23; No).

Then, the inactivation process ends when the irradiation of the laser beam to all black pixels 401 having a grayscale of 0 ends by the determination of step S23 (step S23; Yes).

As a result, according to the recording medium 11 of the first embodiment, an image which is not visible under a general room lamp is observed as a light emitting pattern during the irradiation of the UV ray (electromagnetic wave).

As described above, according to the first embodiment, since the invisible image is formed on the specific invisible material layer 11B including the fluorescent compound, the tamper resistance of the invisible latent image recorded by using the specific invisible material is improved.

[2] Second Embodiment

In the first embodiment, the fluorescent material is used as the specific invisible material. However, a second embodiment is an embodiment in which a temperature indicating material reversibly changing a colorless or white state and a colored state depending on the threshold temperature is used as the specific invisible material.

In this case, when a colorless or white pixel (a grayscale of 1) is used as a pixel which is inactivated by the irradiation of the laser beam, the existence of the specific invisible image (the invisible latent image) is not easily detected and the formation position of the specific invisible image (the invisible latent image) is not easily specified compared with a pixel (a grayscale of 0) which is changed in color or colored with a change in temperature.

The temperature indicating material is a material which undergoes color change with temperature change by using solid-phase reaction, thermal decomposition, dehydration, electron transfer of an electron donor-acceptor, a change in crystalline structure, or the like. Among these, a temperature indicating material using solid-phase reaction or electron transfer of an electron donor-acceptor is preferred.

In particular, as the temperature indicating material using electron transfer of an electron donor-acceptor, a temperature indicating material, which contains a reversal material satisfying the following conditions and a temperature indicating characteristic controller, is exemplified.

As the reversal material, a material, which causes reversible transformation between crystal and amorphous with respect to a part or all of an electron accepting compound and a composition system, or transformation between two phase separations or between phase separation and non-phase separation, is exemplified.

Further, as the temperature indicating characteristic controlling material, the following material is exemplified. The material is solid at room temperature, and is a temperature indicating characteristic controller, at least a part of which is compatible with an electron accepting compound and/or a reversal material. Regarding the temperature indicating characteristic controller, the speed of transformation between crystal and amorphous or transformation between phase separation and non-phase separation of the composition system is changed by transformation between crystal and amorphous or transformation between phase separation and non-phase separation of the temperature indicating characteristic controller, and the interaction between an electron donating compound and an electron accepting compound is not inhibited after the phase separation.

More specifically, examples of the electron donating compound include crystal violet lactone, malachite green lactone, crystal violet carbinol, malachite green carbinol, N-(2,3-dichlorophenyl)leuco auramine, N-benzoyl auramine, rhodamine B lactam, N-acetyl auramine, N-phenyl auramine, 2-(phenyl imino ethane dilidene)-3,3-dimethyl indorine, N-3,3-trimethyl indorinobenzo spiropyran, 8'-methoxy-N-3,3-trimethyl indorinobenzo spiropyran, 3-diethylamino-6-methyl-7-chlorofluoran, 3-diethylamino-7-methoxyfluoran, 3-diethylamino-6-benzyloxyfluoran, 1,2-benz-6-diethylaminofluoran, 3,6-di-p-toluidino-4,5-dimethylfluoran-phenyl hydrazide-γ-lactam, 3-amino-5-methylfluoran, and the like. These can be used alone or in a mixture of two or more kinds thereof.

Further, examples of the electron accepting compound include acidic compounds such as phenols, metal salts of phenol, metal salts of carboxylic acid, sulfonic acid, salts of sulfonic acid, phosphoric acids, metal salts of phosphoric acid, acidic phosphoric acid ester, metal salts of acidic phosphoric acid ester, phosphorous acids, and metal salts of phosphorous acid. These can be used alone or in a mixture of two or more kinds thereof.

Further, compounds having a steroid skeleton and the like are exemplified as a reversal material. Specific examples thereof include cholesterol, stigmasterol, pregnenolone, methyl androstenediol, estradiol benzoate, epiandrostene, stenolone, β-sitosterol, pregnenolone acetate, β-cholestanol, and the like. These can be used alone or in a mixture of two or more kinds thereof.

Further, as the temperature indicating characteristic controller, a compound which is an aromatic alcohol and has at least one phenolic hydroxyl group, aromatic alcohols, a compound having at least one benzoyl group, an aromatic ether compound, a sensitizer which is used in thermal paper, or the like is used.

Specific examples of the compound which is an aromatic alcohol and has at least one phenolic hydroxyl group include p-hydroxyphenethyl alcohol, 2-hydroxybenzyl alcohol, or vanillyl alcohol. Specific examples of the aromatic alcohols include piperonyl alcohol, benzoin, benzhydrol, triphenylmethanol, methyl benzine acid, or benzyl DL-mandelat. Specific examples of the compound having at least one benzoyl group include benzyl, benzoin isopropyl ether, benzyl phenyl ketone, or methyl 2-benzoylbenzoate. Specific examples of the aromatic ether compound include benzyl 2-naphthyl ether or 1-benzyloxy-2-methoxy-4-(1-propenyl)benzene. As the sensitizer, 4-benzyl biphenyl, m-terphenyl, or 4-benzoinbiphenyl is known to be effective.

Further, these temperature indicating materials may be used alone or may be used in a form of microcapsules. Alternatively, these temperature indicating materials may be dispersed in a resin binder for use, and as a resin to be dispersed, microencapsulation of the temperature indicating material or dispersion in a binder resin or the like is exemplified.

Examples of the binder resin include polyethylenes, chlorinated polyethylenes, ethylene copolymers such as an ethylene-vinyl acetate copolymer and an ethylene-acrylic acid-maleic anhydride copolymer, polybutadienes, polyesters such as polyethylene terephthalate, polybutylene terephthalate, and polyethylene naphthalate, polypropylenes, polyisobutylenes, polyvinyl chlorides, polyvinylidene chlorides, polyvinyl acetates, polyvinyl alcohols, polyvinyl acetals, polyvinyl butyrals, fluorine resins, acrylic resins, methacrylic resins, acrylonitrile copolymers, polystyrene, halogenated polystyrene, stylene copolymers such as styrene-methacryate copolymers, acetal resins, polyamides such as nylon 66, polycarbonates, cellulose-based resins, phenolic resins, urea resins, epoxy resins, polyurethane resins, diaryl phthalate resins, silicone resins, polyimide amides, polyether sulfones, polymethyl pentenes, polyether imides, polyvinyl carbazoles, amorphous polyolefins, and the like. These can be used alone or in a mixture of two or more kinds thereof. Examples of materials having such characteristics include METHAMOCOLOR (manufactured by PILOT Corporation), THERMAL COLOR (manufactured by Kiroku Sozai Sogo Kenkyusho Co., Ltd.), and the like.

Further, the color change threshold temperature of the temperature indicating material is desirably in the range of −30° C. to 70° C. and is more desirably in the range of −20° C. to 5° C. or 40° C. to 60° C.

Here, when the threshold temperature is lower than −30° C., a problem arises in that a large-scale apparatus is needed to form an environment of the threshold temperature or less instead of a simple apparatus. Further, a problem arises in that the other materials forming the forgery prevention medium is degraded in an environment of the threshold temperature or less.

Specifically, when the threshold temperature is 70° C. or more, there is a possibility that the other materials forming the forgery prevention medium may be degraded, deformed, or altered in an environment of the threshold temperature or more.

When the threshold temperature of the temperature indicating material is in a low temperature range (−20° C. to 5° C.), a temperature indicating material is used which is transparent or white at a temperature higher than the threshold temperature and becomes colored at a temperature lower than threshold temperature. When the threshold temperature of the temperature indication material is in a high temperature range (40° C. to 60° C.), a temperature indicating material is used which is colored at a temperature higher than the threshold temperature and becomes transparent or white at a temperature lower than the threshold temperature. Anyway, it is more desirable to choose a temperature indicating material which becomes invisible at a normal temperature.

Further, since it is desirable that the color change threshold temperature do not exist in the ordinary life temperature range in order to conceal the forgery prevention function, an easily realized temperature range excluding the temperature range of 5° C. to 40° C. is set. Further, a material can be used which has a plurality of color change threshold temperature values and is changed in color as three or more colors in accordance with a temperature.

Next, an operation of the second embodiment will be described.

Even in the second embodiment, the specific invisible image forming process illustrated in FIG. 4 is the same as the first embodiment. However, since the invisible latent image forming process of the second embodiment is different from that of the first embodiment, the invisible latent image forming process will be described below.

Figure 7:
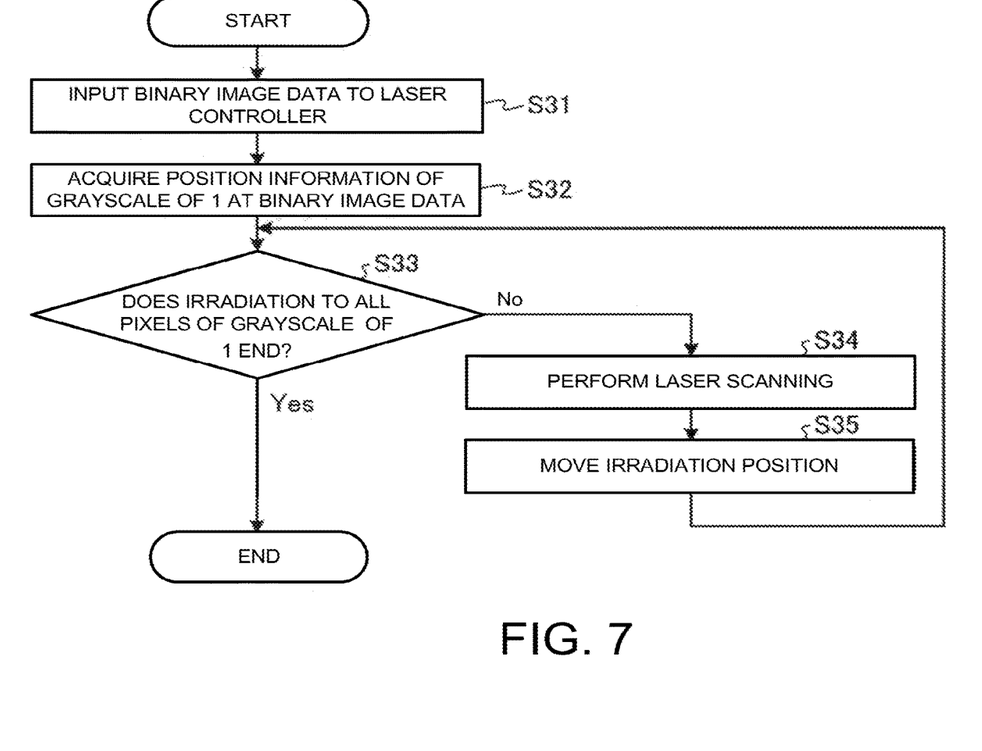
FIG. 7 is a flowchart illustrating an invisible latent image forming process of a second embodiment.

FIG. 7 is a flowchart of the invisible latent image forming process of the second embodiment.

Figure 8:
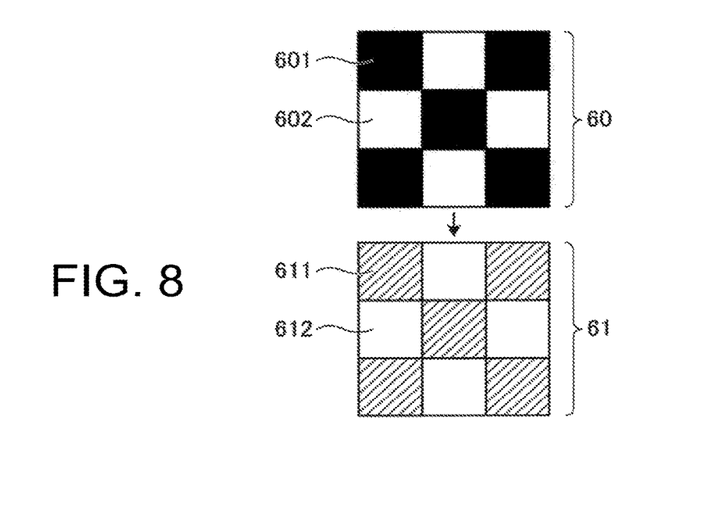
FIG. 8 is a diagram illustrating a binary image and an inactivation target pixel of the second embodiment.

FIG. 8 is a diagram illustrating a binary image and an inactivation target pixel of the second embodiment.

In the description below, the binary image corresponding to the binary image data is set so that a grayscale of a black pixel 601 is set to 0 and a grayscale of a white pixel 602 is set to 1.

When a binary image data is input to the laser controller 14A (step S31), the laser controller 14A acquires the position information of the white pixel 602 having a grayscale of 1 at a binary image 60 illustrated in FIG. 8 (step S32). The image processing apparatus 12 and the laser controller 14A specify a position of a pixel (a white pixel) that needs to stop the changing in color or coloring in accordance with an increase in temperature as an inactivation target pixel position.

Next, the laser controller 14A determines whether the irradiation of the laser beam to all white pixels 602 having a grayscale of 1 ends (step S33).

In this case, since the irradiation of the laser beam is not performed (step S33; No), the laser controller 14A controls the laser oscillator 14B so that the laser beam is irradiated to the white pixel 602 having a grayscale of 1 corresponding to the scanning position through laser scanning (step S34). Accordingly, the specific invisible material 612 corresponding to the white pixel 602 is inactivated.

On the contrary, an invisible latent image 61 of the binary image 60 corresponding to the binary image data is formed as a whole while a specific invisible material 611 corresponding to the black pixel 601 is inactivated as it is. That is, even when the pixel having a grayscale of 1 in the binary image 60 increases in temperature, the pixel is recorded as a pixel which is not changed in color or colored.

Subsequently, the laser controller 14A moves the irradiation position (the scanning position) (step S35), and the process is returned to step S33 again.

Hereinafter, the processes in step S33 to step S35 are repeated in the same way during a period in which the irradiation of the laser beam to all white pixels 602 having a grayscale of 1 does not end by the determination of step S33 (step S33; No).

Then, the inactivation process ends when the irradiation of the laser to all white pixels 602 having a grayscale of 1 ends by the determination of step S33 (step S33; Yes).

As a result, according to the recording medium 11 of the second embodiment, an image which is not visible under a general room lamp becomes visible and is observed when the image is discolored or colored in accordance with an increase in temperature.

As described above, since the invisible image is formed on the specific invisible material layer 11B including the temperature indicating material even in the second embodiment, the tamper resistance of the invisible latent image recorded by using the specific invisible material is improved.

[3] Modification of Embodiment

In the description above, the pixel (the black pixel) not emitting fluorescent light is inactivated when the fluorescent compound is used as the specific invisible material, and the pixel (the colorless pixel or the white pixel) maintained in the state before the coloring is inactivated when the temperature indicating material is used as the specific invisible material. However, the pixels can be inactivated in a reverse manner.

In the above-described embodiments, one kind of specific invisible material is used, but the UV fluorescent material, the IR fluorescent material, and the temperature indicating material can be appropriately selected and used in mixture thereof as the specific invisible material. In this case, a plurality of kinds of specific invisible materials may be used in mixture or a plurality of kinds of specific invisible materials may be respectively formed in a plurality of areas of the surface of the normal recording medium 11A. When a plurality of kinds of specific invisible materials is used in mixture, the same image can be visibly recognized by the processes respectively corresponding to the specific invisible materials. When a plurality of kinds of specific invisible materials is laminated on a plurality of areas of the surface of the normal recording medium 11A, an image of each area can be visibly recognized by the process corresponding to each of the specific invisible materials. In these cases, the tamper resistance of the invisible latent image recorded by using the specific invisible material is further improved.

Further, a change in the number of the lasers or the irradiation condition (the wavelength, the power, and the irradiation period) used for the inactivation is not limited to the above-described embodiments, and can be modified if necessary. Further, the image formed by the specific invisible material can have a grayscale. At that time, the image process in the image processing apparatus 12 can be modified in accordance with the number of the grayscales.

Further, since it is more desirable to use a wavelength having a difference between the absorption wavelength of the recording medium and the absorption wavelength of the specific invisible material as the laser used for the inactivation, the laser having an appropriate wavelength can be selected.

Further, even in the wavelength of the laser beam, it is more desirable to use a wavelength having a difference between the absorption wavelength of the recording medium and the absorption wavelength of the specific invisible material. Accordingly, for example, a laser is most desirable in which two wavelengths are selected from a basic wave, a second harmonic wave, a third harmonic wave, and a fourth harmonic wave, one wavelength is used for the absorption band of the normal recording medium 11A and the non-absorption band of the specific invisible material layer 11B, and the other wavelength is used for the non-absorption band of the normal recording medium 11A and the absorption band of the specific invisible material layer 11B. In addition, the reason that the fifth harmonic wave or more is not considered is that the energy abruptly decreases and thus the influence thereof is small.

While several embodiments of the present invention have been described, these embodiments are merely examples and are not intended to limit the scope of the invention. These novel embodiments can be modified into various forms, and various omissions, replacements, and modifications can be made without departing from the spirit of the present invention. These embodiments or the modifications thereof are included in the scope or the spirit of the present invention, and are included in the range equivalent to the present invention of claims.

What is claimed is:

1. A forgery prevention medium manufacturing method comprising:

preparing a substrate;

applying a temperature indicating material directly or indirectly on the substrate in a plane shape, the temperature indicating material having a first color change threshold temperature and a second color change threshold temperature, wherein the temperature indicating material is in a first color state at a temperature equal to or lower than the first color change threshold temperature, is in a second color state at a temperature higher than the second color change threshold temperature, and is in a third color state at a temperature between the first color change threshold temperature and the second color change threshold temperature, and wherein the temperature indicating material reversely changes between the first color state, the second color state, and the third color state; and irradiating the temperature indicating material partially with laser light to form a latent image in the temperature indicating material by inactivating a portion irradiated with the laser light of the temperature indicating material, wherein the latent image is formed by generating gray scale image data corresponding to the latent image, generating binary image data in which the gray scale image data is binarized, specifying a position of a pixel that needs to stop changing in color in accordance with an increase in temperature as an inactivation target pixel position, and then irradiating that inactivation target pixel position with the laser light;

wherein the first color change threshold temperature is in a low temperature range of −20° C. to 5° C., and the temperature indicating material is in the first color state at a temperature lower than that first color change threshold temperature, wherein the second color change threshold temperature is in a high temperature range of 40° C. to 60° C., and the temperature indicating material is in the second color state at a temperature equal to or higher than that second color change threshold temperature, wherein the temperature indicating material is in the third color state at a temperature between the first color change threshold temperature and the second color change threshold temperature, and wherein the first color state is a colored state, the second color state is a colored state, and the third colored state is an invisible state.

\* \* \* \* \*